UNITED STATES PATENT OFFICE.

GEORGE WIESMANN, OF CINCINNATI, OHIO.

STEEL-WELDING COMPOUND.

No. 837,443.

Specification of Letters Patent.

Patented Dec. 4, 1906.

Application filed February 26, 1906. Serial No. 303,076.

*To all whom it may concern:*

Be it known that I, GEORGE WIESMANN, a citizen of the United States, residing at Cincinnati, in the county of Hamilton and State of Ohio, have invented a new and useful Improvement in Steel-Welding Compounds, of which the following is a specification.

This invention relates to a compound for welding steel; and the object of the invention is a welding compound capable of standing a very intense heat.

This compound consists of saltpeter, borax, a mineral dust, either marble or brick dust preferred, and iron scales.

The various ingredients are cooked or boiled until finely pulverized, and the compound is then ready for use. A compound consisting of these ingredients in the following-named proportions has been tested and found satisfactory: one ounce of saltpeter, six ounces of borax, four ounces of brick-dust, and six ounces of iron scales. If desired, the brick-dust can be mixed with marble-dust; but the brick-dust by itself has been found satisfactory and is more readily obtainable in most localities. When steel has been burned through being brought to more than a cherry heat, it can be welded by using the above-described compound equally as well as unburned steel.

Having thus fully described my invention, what I claim as new, and desire to secure by Letters Patent, is—

1. A welding compound consisting of saltpeter, borax, a mineral dust, and iron scales.

2. A welding compound consisting of saltpeter, borax, brick and marble dust and iron scales.

3. A welding compound consisting of six parts of borax, six parts of iron scales, four parts of mineral dust, and one part of saltpeter, all in a pulverized condition.

GEORGE WIESMANN.

Witnesses:
   JOHN E. BRUCE,
   J. E. DEININGER.